INVENTOR.
Frederick B. Curtenius
BY
ATTORNEY

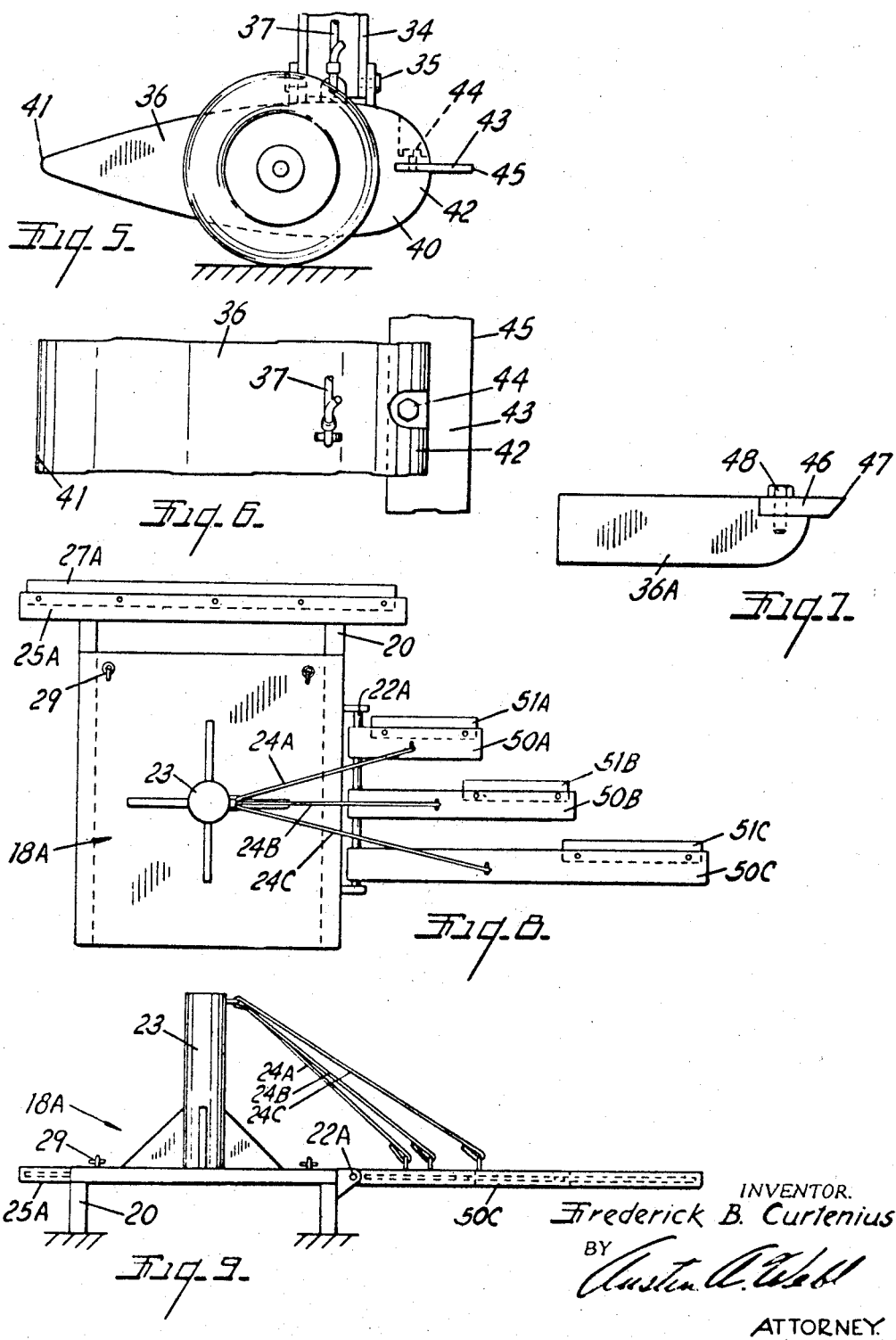

United States Patent Office 3,427,792
Patented Feb. 18, 1969

3,427,792
TRACTOR PROPELLED MOWER WITH FIXED CUTTERS
Frederick B. Curtenius, 1537 Long Road,
Kalamazoo, Mich. 49001
Filed Aug. 22, 1966, Ser. No. 574,235
U.S. Cl. 56—229                                    15 Claims
Int. Cl. A01d 55/02, 35/08

ABSTRACT OF THE DISCLOSURE

A straight cutter bar is mounted on a support for linear advance parallel to the ground and transverse to its length. The bar is carried on a towed skid or directly on a powered vehicle to be advanced over the ground at speeds in excess of 20 miles per hour.

---

The object of the invention is to reduce the cost in time and equipment necessary to mow the grass along the shoulders and median strip and the wider portions of the right of way of highways. The method and apparatus are also useful in mowing the "rough" of golf courses and other large areas where it is desired to cut grass to a uniform height. In either use, the term grass is used to define true grasses and other similar growth having relatively small stems, stalks or bodies.

The method of the invention involves the single step of linearly advancing a cutting bar having a leading cutting edge, across the area to be mowed, with the length of the cutting edge transverse to the path of linear advance. The speed of the advancing motion is sufficiently great so that the cutting edge, which is desirably sharpened, will shear through and cut the individual blades of grass before the normal mass and inertia of the standing grass can yield under the impact of the cutting edge.

The necessary speed of advance of the cutting bar, and its cutting edge, is variable, depending on the sharpness of the cutting edge. It will be appreciated that an extremely sharp razor-like cutting edge will cut effectively at a slower speed than a duller edge. Other factors such as the ease and safety with which the cutting edge may be handled and sharpened to the desired degree of sharpness enter into the selection of the cutting edge, and its speed of operation. The maximum speed of the cutting bar is limited only by the nature of the terrain, over which the cutting bar and its supporting and advancing mechanism may be advanced with safety.

The apparatus of the invention includes a cutter bar or member of sufficient strength to be passed rapidly across or along an area of grass, while cutting a swath equal in width the length of the cutting edge. The cutting edge may be grounded directly on the bar, or a sepate blade may be attached to the bar. A support capable of supporting the cutter bar at the desired height and angle from the side of the support is provided; and means for advancing the support and bar in a lineal path, at the desired speed are provided.

The accompanying drawings, of which there are two sheets, illustrate towed and self-propelled forms of the apparatus, two different forms of cutter bars and blades, and a modified arrangement of plural and staggered cutter bars.

FIGURE 5 is an enlarged end elevational view of one form of cutter bar such as that shown in FIGURE 3.

FIGURE 6 is a fragmentary top plan view of the bar in FIGURE 5.

FIGURE 7 is an end elevational view of a modified form of cutter bar.

FIGURE 8 is a top plan view of a modified form of cutter bar arrangement on a support.

FIGURE 9 is a rear elevational view of the cutter bars and support in FIGURE 8.

Figure 1:
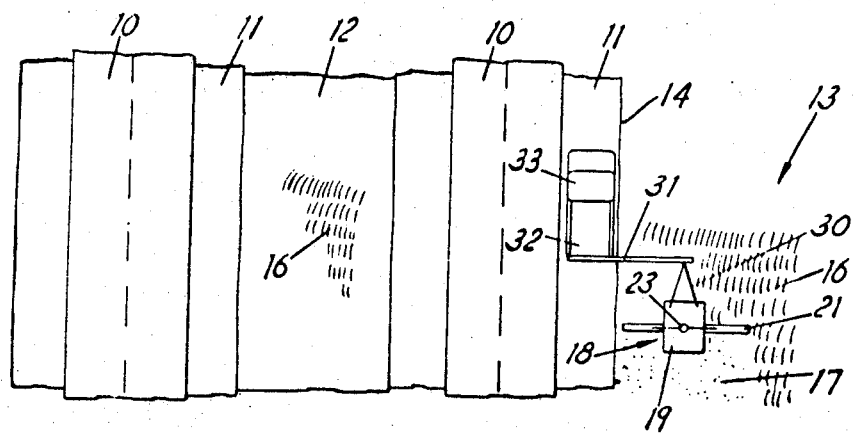
FIGURE 1 is a fragmentary plan view of a portion of a divided highway with apparatus of the invention in operating relation thereto, to perform the mowing method of the invention.

FIGURE 1 shows a divided highway having spaced roadways 10 with shoulders 11 on each side. A median strip or area 12 separates the two roadways, while a cleared and rough graded right-of-way on the outside of one shoulder is indicated at 13. Marker posts 14 with reflectors 15 thereon are commonly found along the edge of the right shoulders.

The median and the right-of-way are planted to grass indicated at 16, and a swath of this grass has been cut as indicated by the stubble at 17, by advancing the mowing apparatus rapidly along the shoulder of the highway.

Figure 2:
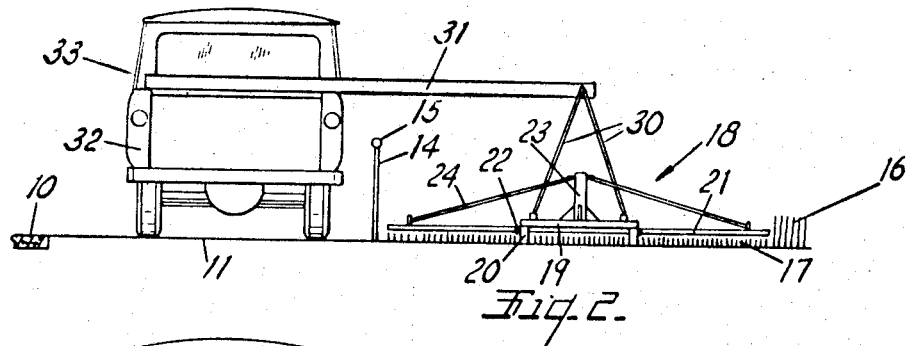
FIGURE 2 is an enlarged rear elevational view of the apparatus shown in FIGURE 1, which involves a towed form of the apparatus.
Figure 4:
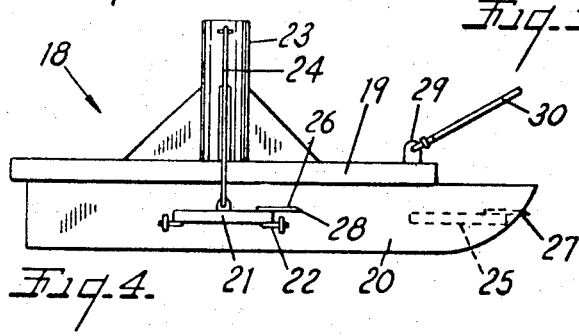
FIGURE 4 is an enlarged side elevational view of the towed apparatus shown in FIGURES 1 and 2.

The apparatus shown in FIGURES 1, 2 and 4 consists of a support or skid generally indicated at 18 and having a platform 19 mounted on spaced runners 20. A pair of elongated cutter bars or members 21 are pivoted to the sides of the runners by suitable pivots 22, while a post or upright 23 on the top of the platform serves as an anchor for the cables 24 that support the laterally outer ends of the cutter bars. A third cutter bar 25 is mounted between the forward ends of the runners.

The cutter bars 21 and 25 have forwardly projecting knives or cutter blades 26 and 27 secured thereto and extending forwardly therefrom. Desirably the cutter blades have sharpened knife edges 28 on their forward edges.

The platform 19 of the supporting skid has rings or brackets 29 on its front which constitute means to connect the towing means for advancing the support. In this towed version of the apparatus, cables 30 connect the skid via brackets 29 to a towing boom 31 secured in projecting relation from the side of the body 32 of a light truck 33. In this position, the truck can travel along the shoulder 11 at high speed with the boom passing over the posts 14.

Figure 3:
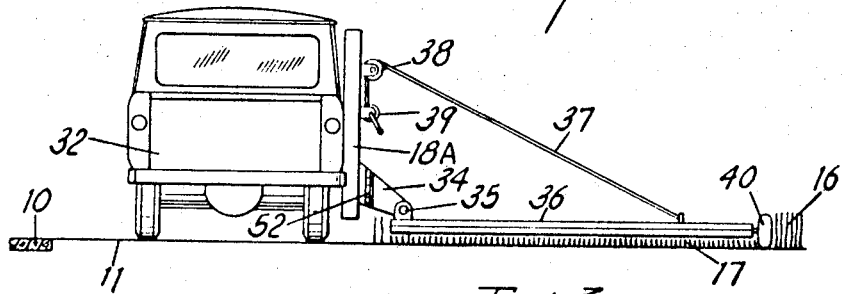
FIGURE 3 is a rear elevational view of a self-propelled form of the apparatus.

FIGURE 3 shows a self-propelled form of the apparatus in which the support 18A in the form of an upright bar or post is secured to the side of the truck body 32. A bracket 34 on the lower end of the support bar is pivotally connected at 35 to the inner end of the cutter bar 36. A cable 37 is connected midway of the cutter bar and passes upwardly and inwardly over a pulley 38 on the support. The cable then extends down to a hand operated drum or winch 39 that constitutes an adjustable means for fixing the horizontal angle of the cutter bar, and also for lifting the cutter bar to upright position for transit. The outer end of the cutter bar has a ground engaging spacer member in the form of a wheel 40 for fixing the spacing of the outer end of the bar from the ground.

FIGURES 5, 6 and 7 show two different cutter bars in greater detail. Either of these may be used with either of the supports just described. Since the cutter bars are advanced at relatively high speed, and since they are of substantial thickness to support their own weight and resist the force of cutting the grass, the cutter bars tend to create a high pressure area or air pressure wave in front of them. Bar 36, which corresponds to the bar in FIGURE 3 has an airfoil cross section with a thin tapered rear edge 41 and a bluntly rounded leading edge 42. A narrow slot in the leading edge removably receives a thin blade or knife 43 that is held in place by bolts 44.

The blade 43, being relatively thin, can have a square or unsharpened edge 45. Both edges can be used before the blade must be reground. The wheel or roller 40 should be solid or of limited resiliency so that the wheel does not bounce in traversing uneven ground.

FIGURE 7 shows a cutter bar 36A of generally rectangular cross section, an upwardly and forwardly curved leading edge on its underside, so as to pass easily over obstructions. A cutter blade 46 with a ground and sharpened knife edge 47 is secured in a notch in the bar by bolts 48.

FIGURES 8 and 9 show a modified form of cutter bar arrangement applied to a skid support 18A. The skid is similar to that shown in FIGURES 1, 2 and 4, having towing connections 29. A first cutter bar 25A is secured across the front ends of the runners 20, and has a cutting blade 27A projecting from its forward edge. The blade 27A projects beyond the sides of the runners to cut all of the grass in front of the skid and a little to each side.

Pivoted to the side of skin 18A by a common pivot 22A are three cutter bars 50A, 50B and 50C. The bars are supported by cables 24A, 24B and 24C from the post 23 and are progressively longer toward the rear of the skin. Each carries a cutting blade 51A, 51B and 51C on its leading edge with the laterally outer end of the forward blades transversely overlapping the inner end of the next rearward blade. By staggering the cutting blades in this way, the effect of the forward pressure area is reduced as to each cutter blade that has passed its portion of the swath.

As noted, the several forms of the cutter bars and blades are interchangeable on the different forms of supports, and also in the different arrangements of the cutter bars.

In some instances or applications of the apparatus, it may be desirable to permit or cause the cutter bar to swing horizontally into parallel relation to its path of motion. This may be for the purpose of moving to inoperative position for transport to and from work, or to avoid obstacles in the path of the cutter bar, or to yield upon striking an obstacle. To this end, a vertically disposed hinge or pivot axis is indicated at 52 in FIGURE 3. A variety of equivalent mechanisms for achieving this horizontal swinging, either in combination with or in substitution for vertical swinging of the bar, will be evident without further disclosure.

By comparison to a farmer swinging an old fashioned scythe, it is estimated that the lineal speed of the scythe on the cutting stroke is not over fifteen or twenty miles per hour. If the farmer kept the scythe sharpened, by frequent whetting, he could cut even green hay, grass and weeds. Accordingly, a speed of twenty miles per hour with a scythe sharp edge on the cutting blade is adopted as an arbitrary minimum for the purpose of this invention. The economies of the invention are achieved more fully with higher speeds.

What is claimed as new is:

1. Apparatus for mowing grass comprising:
    a support adapted to be supported in stable position from the ground adjacent from where the grass is growing,
    an elongated cutting fixedly carried by said support in spaced relation to the ground,
    a cutting edge on the leading edge of said cutting member, and
    means for advancing said support along the ground in a linear direction transverse to said cutting edge and at a speed such that the natural inertia of the grass cause said cutting edge to shear through the grass.

2. Apparatus as defined in claim 1 in which said support has a connection adapted to be connected to said means for advancing the support.

3. Apparatus as defined in claim 2 in which said support is a skid adapted to slide along the ground.

4. Apparatus as defined in claim 3 in which said cutting member projects from the side of said support in transverse relation to the direction of advance of the support.

5. Apparatus as defined in claim 4 in which there is a ground engaging element on the end of said cutting member remote from said support and adapted to further support said cutting edge in generally parallel relation to the ground.

6. Apparatus as defined in claim 5 in which said cutting member is vertically adjustably mounted on said support to swing in a plane transverse to the lineal motion of said support, and means for adjusting the angular position of said cutting member relative to said support.

7. Apparatus as defined in claim 6 in which said cutting member has an airfoil cross section, and said cutting edge is formed on a blade removably connected to said cutting member with the leading edge of the blade constituting said cutting edge, said blade and the cutting edge thereon projecting forwardly of the leading edge of said cutting member.

8. Apparatus as defined in claim 1 in which said means has driven ground engaging wheels thereon and is capable of speeds in excess of the order of 20 miles per hour.

9. Apparatus as defined in claim 8 in which said cutting member projects from the side of said support in transverse relation to the direction of advance of the support.

10. Apparatus as defined in claim 9 in which there is a ground engaging element on the end of said cutting member remote from said support and adapted to further support said cutting edge in generally parallel relation to the ground.

11. Apparatus as defined in claim 9 in which said cutting member is vertically adjustably mounted on said support to swing in a plane transverse to the lineal motion of said support, and means for adjusting the angular position of said cutting member relative to said support.

12. Apparatus as defined in claim 1 in which said cutting member has an airfoil cross section, and said cutting edge is formed on a blade removably connected to said cutting member with the leading edge of the blade constituting said cutting edge, said blade and the cutting edge thereon projecting forwardly of the leading edge of said cutting member.

13. Apparatus as defined in claim 1 in which said cutting member has an upwardly and forwardly rounded leading edge, and said cutting edge is formed on a blade removably connected to said cutting member above said rounded edge and projecting in front thereof.

14. Apparatus as defined in claim 1 in which said support has plural cutting members of different lengths projecting therefrom, one behind the other, and cutting edges on the leading edge of each cutting member with the cutting edge of the longer cutting member terminating at its inner end in transversely overlapping relation to the cutting edge on the shorter member.

15. Apparatus as defined in claim 14 in which the shorter cutting member is located forwardly of the longer cutting member.

References Cited

UNITED STATES PATENTS

| 831,689 | 9/1906 | Stevenson | 56—229 |
| 1,069,736 | 8/1913 | Shorman | 56—6 |
| 1,279,060 | 9/1918 | Wilder | 56—6 |
| 1,291,813 | 1/1919 | Engelhardt | 56—25 |
| 1,458,615 | 6/1923 | Boyle | 56—121.4 |
| 1,829,934 | 11/1931 | Imus | 56—229 |
| 2,861,409 | 11/1958 | Kosch et al. | 56—25 |
| 3,103,090 | 9/1963 | Campbell | 56—6 |
| 3,340,681 | 9/1967 | Strawbridge | 56—229 |

RUSSELL R. KINSEY, Primary Examiner.

U.S. Cl. X.R.

56—25